(12) United States Patent
Harrison et al.

(10) Patent No.: US 6,854,693 B2
(45) Date of Patent: Feb. 15, 2005

(54) CABLE ASSEMBLY RETENTION

(75) Inventors: Joe A. Harrison, Olympia, WA (US); Anthony P. Valpiani, Graham, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/308,615

(22) Filed: Dec. 3, 2002

(65) Prior Publication Data

US 2004/0104314 A1 Jun. 3, 2004

(51) Int. Cl.⁷ .............................. F16L 3/22; F16B 15/00
(52) U.S. Cl. ...................... 248/68.1; 24/16 PB; 248/71
(58) Field of Search .......................... 248/68.1, 71, 74.3, 248/74.2, 74.4, 60, 62, 74.5; 24/16 PB

(56) References Cited

U.S. PATENT DOCUMENTS

| | | | | |
|---|---|---|---|---|
| 2,937,834 A | * | 5/1960 | Orenick et al. ............... | 248/71 |
| 3,341,903 A | * | 9/1967 | Buntic ...................... | 24/16 PB |
| RE27,357 E | * | 5/1972 | Merser ........................ | 248/71 |
| 3,712,655 A | * | 1/1973 | Fuehrer ...................... | 292/321 |
| 3,758,060 A | * | 9/1973 | Schuplin .................... | 248/74.3 |
| 4,441,233 A | * | 4/1984 | Swift ....................... | 24/16 PB |
| 4,826,193 A | * | 5/1989 | Davis ...................... | 280/304.1 |
| 6,142,892 A | * | 11/2000 | Dennis ....................... | 473/494 |
| 6,443,403 B1 | * | 9/2002 | Page et al. .................... | 248/71 |

\* cited by examiner

Primary Examiner—Leslie A. Braun
Assistant Examiner—Tan Le
(74) Attorney, Agent, or Firm—Carrie A. Boone, P.C.

(57) ABSTRACT

A tie wrap assembly comprises a tie wrap, for retaining a cable assembly, and a tie wrap base, for connecting the cable assembly to the chassis. The tie wrap includes a shaped engagement member for fittably coupling to an orifice within the tie wrap base. The tie wrap base is flexible, allowing the engagement member to be repeatedly inserted into and removed from the tie wrap base, as well as being fit through a hole in the chassis. One or more tie wrap bases are disposed at pre-arranged locations along the chassis. The tie wrap assembly allows cabling to be consistently routed along the pre-arranged locations, facilitating the consistent placement of cables in a mass production environment.

9 Claims, 4 Drawing Sheets

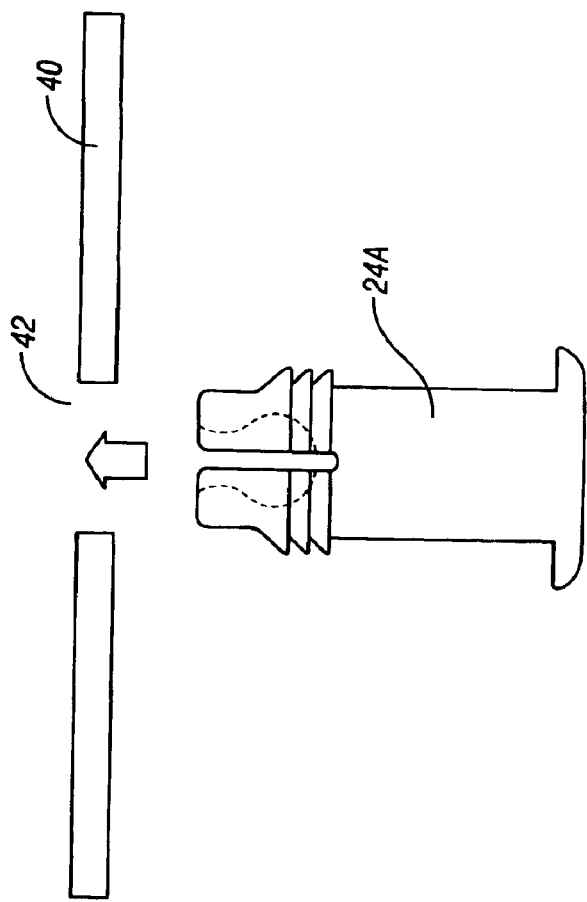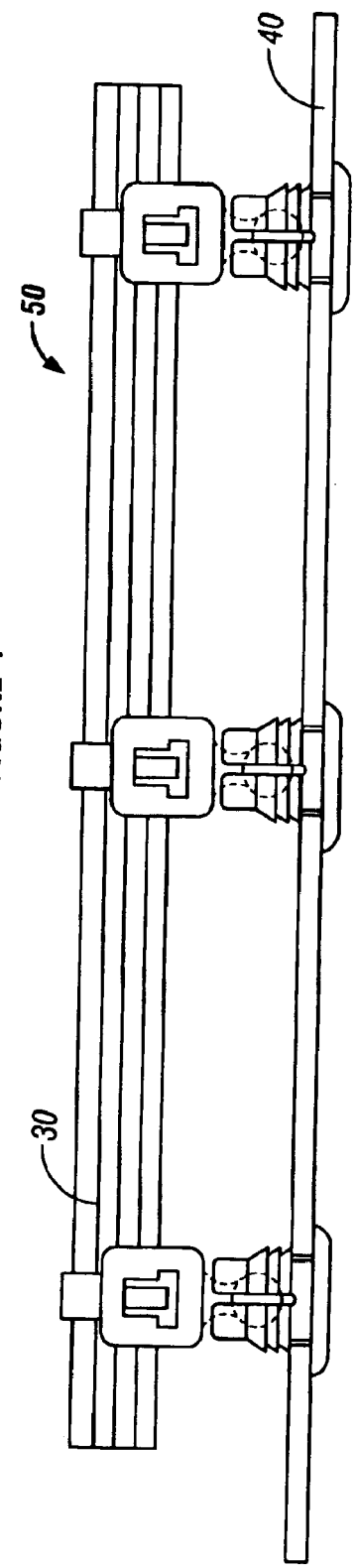

CABLE ASSEMBLY RETENTION

FIELD OF THE INVENTION

This invention relates to tie wraps and, more particularly, to a reusable tie wrap retention solution.

BACKGROUND OF THE INVENTION

Tie wraps are strips of material used to retain or collect a length of cable, wires, or other materials. Tie wraps may be used to gather a group of wires emanating from a computer system or to gather ribbon cable within the computer system chassis, for example. Where the materials to be contained are long, multiple tie wraps may be disposed at intervals along the materials.

Tie wraps are available in many forms. Generally made from an elastomeric material such as nylon, the tie wrap generally includes a clasp at one end through which the other end passes, forming a loop. The tie wrap is placed transverse to the materials to be contained, the end is fed through the clasp, and the end is pulled, tightening the tie wrap around the materials. Sometimes, the clasp includes teeth which allow one-way engagement of the tie wrap. Once the tie wrap end is fed through the clasp, it cannot be loosened, but only tightened. Further, such a tie wrap is removed generally by cutting the tie wrap from the materials, which destroys the tie wrap.

In some environments, cutting the tie wraps is undesirable. During maintenance of a computer system, for example, a cable assembly may be removed from a chassis in order to gain access to other circuitry, such as the motherboard. Once the cable assembly has been removed, it may be difficult to ascertain its original location or configuration.

Thus, there is a continuing need for a tie wrap assembly that overcomes the shortcomings of the prior art.

BRIEF DESCRIPTION OF THE DRAWINGS

FIG. 4 is a diagram of a second tie wrap base according to some embodiments of the invention;

FIG. 5 is a diagram of a tie wrap assembly retaining a cable assembly against a chassis according to some embodiments of the invention.

DETAILED DESCRIPTION

According to the embodiments described herein, a tie wrap assembly is disclosed, for retaining a cable assembly against a chassis. The tie wrap assembly comprises a tie wrap, for retaining the cable assembly, and a tie wrap base, for connection to the chassis. The tie wrap includes a shaped engagement member for fittably coupling to an orifice within the tie wrap base. The tie wrap base is flexible, allowing the engagement member to be repeatedly inserted into and removed from the tie wrap base, as well as being fit through a hole in the chassis. One or more tie wrap bases are disposed at pre-arranged locations along the chassis. The tie wrap assembly allows cabling to be consistently routed along the pre-arranged locations, facilitating the consistent placement of cables in mass-produced systems, and allowing the removal and installation in the pre-arranged locations.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. For example, reference in the specification and title is made to a cable assembly, which may include devices such as ribbon, coaxial, and port cables, antenna and telephone wires, or other computer-related devices. However, cable assembly may further include straps, harnesses, or other retention materials, and may be made from materials, such as steel, plastic, rubber, or combinations of materials not described herein. The following detailed description is, therefore, not to be construed in a limiting sense, as the scope of the present invention is defined by the claims.

Figure 1:
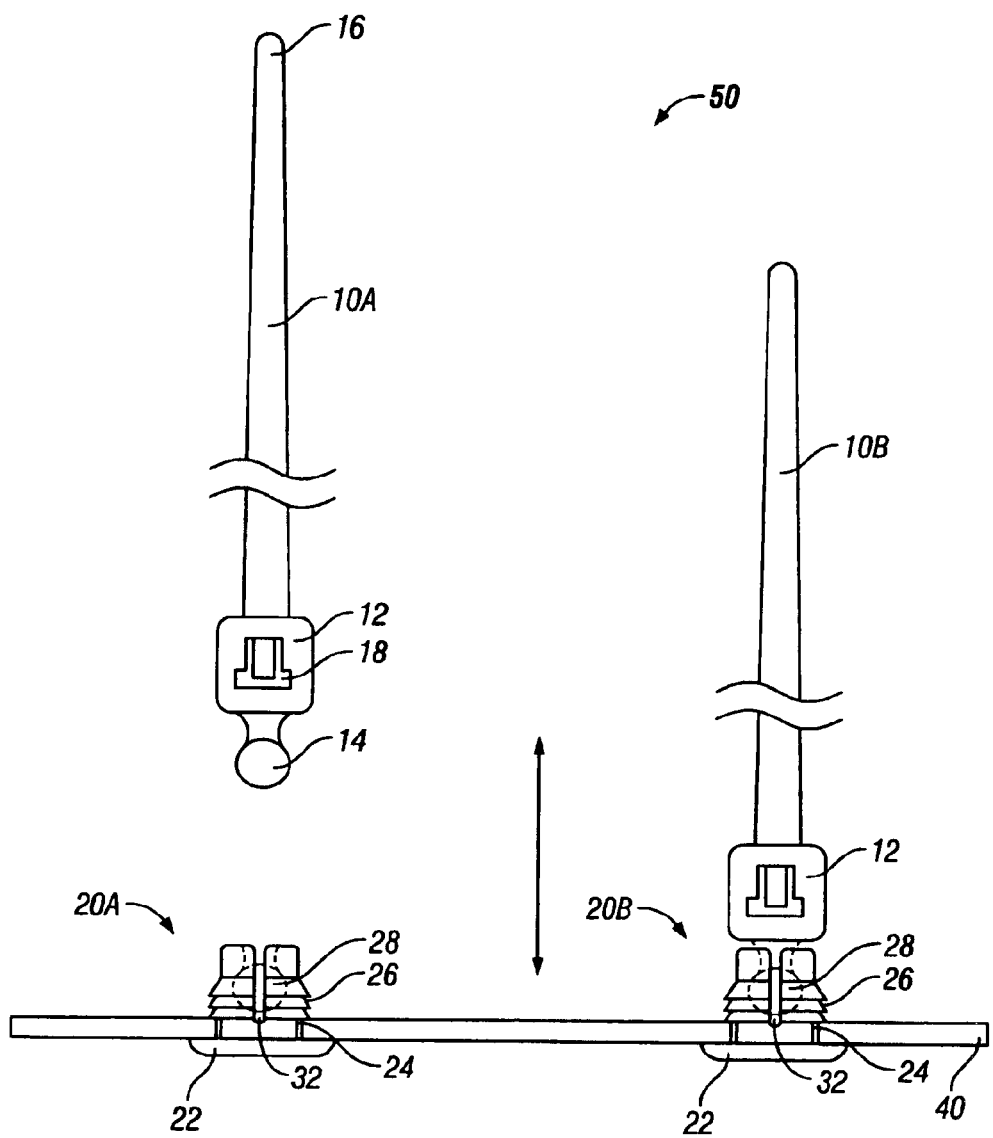
FIG. 1 is a diagram of a tie wrap assembly comprising two tie wrap/tie wrap base pairs according to some embodiments of the invention.

In FIG. 1, according to one embodiment, a tie wrap assembly 50 is depicted, including tie wrap 10A and tie wrap 10B (collectively, tie wraps 10), as well as tie wrap base 20A and tie wrap base 20B (collectively, tie wrap bases 20). The tie wrap 10A is disengaged from the tie wrap base 20A while the tie wrap 10B is fully engaged with the tie wrap base 20B. Although two tie wraps and bases are depicted in FIG. 1, the tie wrap assembly 50 may include any number of tie wrap/base pairings. Preferably, the tie wrap 10 and the tie wrap base 20 are composed of a flexible, elastic or elastomeric material, such as nylon.

Figure 2:
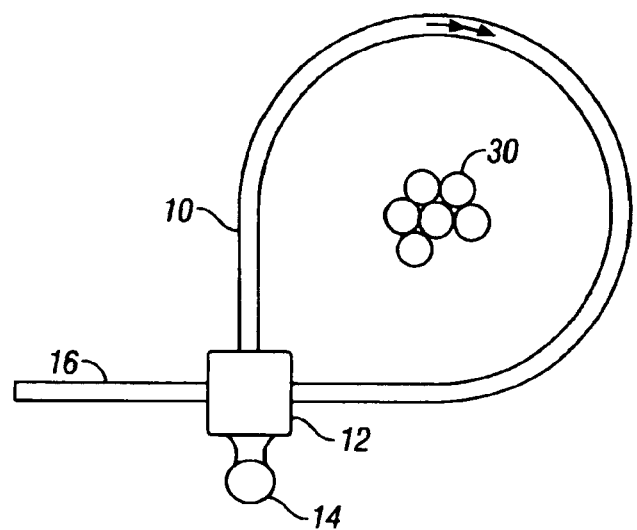
FIG. 2 is a side view of a tie wrap according to some embodiments of the invention.

The tie wrap 10 is an elongated flexible projection for wrapping around a cable assembly 30, a collection of cords, or other congregation of materials needing to be relatively contained. The tie wrap 10 includes an end member 16, for engagement through an opening 18 of a clasp 12. In the side view of FIG. 2, the tie wrap 10 is flexibly arranged around a cable assembly 30, for insertion into the opening 18 of the clasp 12.

Also connected to the clasp 12 is an engagement member 14, for coupling the tie wrap 10 to its respective tie wrap base 20. The tie wrap base 20 includes a retention orifice 28 within a tapered shaft 26, for receiving the engagement member 14. The tapered shaft 26 includes a flute 32, disposed along the length of the tapered shaft, which permit the shaft to flex transversely outward when the engagement member 14 is inserted into the retention orifice 28 until a snug fit within the orifice is obtained. The flute 32 is a slender vertical opening that forms a division within the tapered shaft 26. Other ways to secure the tie wrap engagement member 14 are possible. Once the engagement member 14 is fully connected into the orifice 28, the shaft 26 returns to its original unflexed position.

A simple pulling operation is sufficient to remove the tie wrap 10 from the tie wrap base 20. Again, the tapered shaft 26 of the tie wrap base 20 flexes transversely outward, freeing the engagement member 14 from the orifice 28. In some embodiments, the insertion and removal of the tie wrap 10 from the tie wrap base 20 generates a snapping or popping sound.

In FIG. 1, the engagement member 14 is a globe-shaped protrusion from the tie wrap 10; the retention orifice 28 in the tie wrap base 20 is likewise a globe-shaped cavity.

However, designers of ordinary skill in the art recognize that many other shapes for mating the engagement member 14 into the orifice 28 are possible without departing from the spirit of the invention.

The tie wrap base 20 further includes a head 22 and a shank 24 coupled to the tapered shaft 26. As shown in FIG. 1, the head 22 is visible from one side of the chassis 40, while the shaft 26 is visible from the other side. The chassis 40 may be a printed circuit board (PCB), a computer housing, or another structure against which the cable assembly 30 is to be retained.

Figure 3:
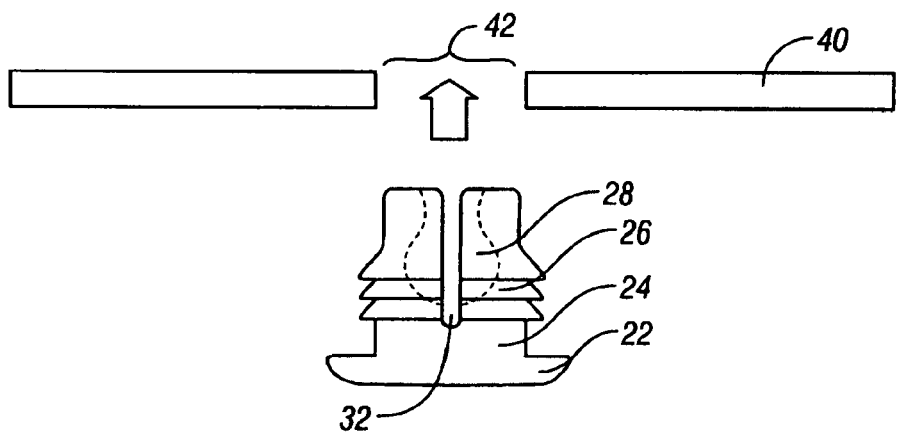
FIG. 3 is a diagram of a tie wrap base according to some embodiments of the invention.

One or more holes 42 can be stamped into the chassis 40 for receiving one or more tie wrap bases 20. As shown in FIG. 3, the tie wrap base 20 can be fit into the chassis 40 by first inserting the tapered shaft 26 through the hole 42, then pushing the tie wrap base 20 through the hole 42 until further movement is stopped by the head 22. The tapered shaft 26 may flex transversely inward during insertion into the hole 42. Preferably, the hole 42 is about the size of the shank 24 and smaller than the diameter of the head 22. Alternatively, the tie wrap base 20 may be affixed to the chassis 40 by gluing the head 22 directly to the chassis.

In some embodiments, the shank 24 of the tie wrap base 20 is lengthened, such as in the shank 24A of FIG. 4. This allows the retained cable assembly 30 to be at some distance from the chassis 40. Tie wrap bases 20 can be manufactured in a variety of sizes and shapes. A combination of tie wrap base sizes may be used within a single application.

In FIG. 5, a side view of a tie wrap assembly 50 includes three tie wrap/base pairs retaining a cable assembly 30 against the chassis 40. To temporarily remove the cable assembly 30 from the chassis 40, each tie wrap 10 is simply removed from its respective tie wrap base 20. The tie wrap 10 continues to be wrapped around the cable assembly 30. Following operations for which the cable assembly 30 was removed, such as during computer maintenance, the tie wraps 10 are re-inserted into their respective tie wrap bases 20.

Figure 6:
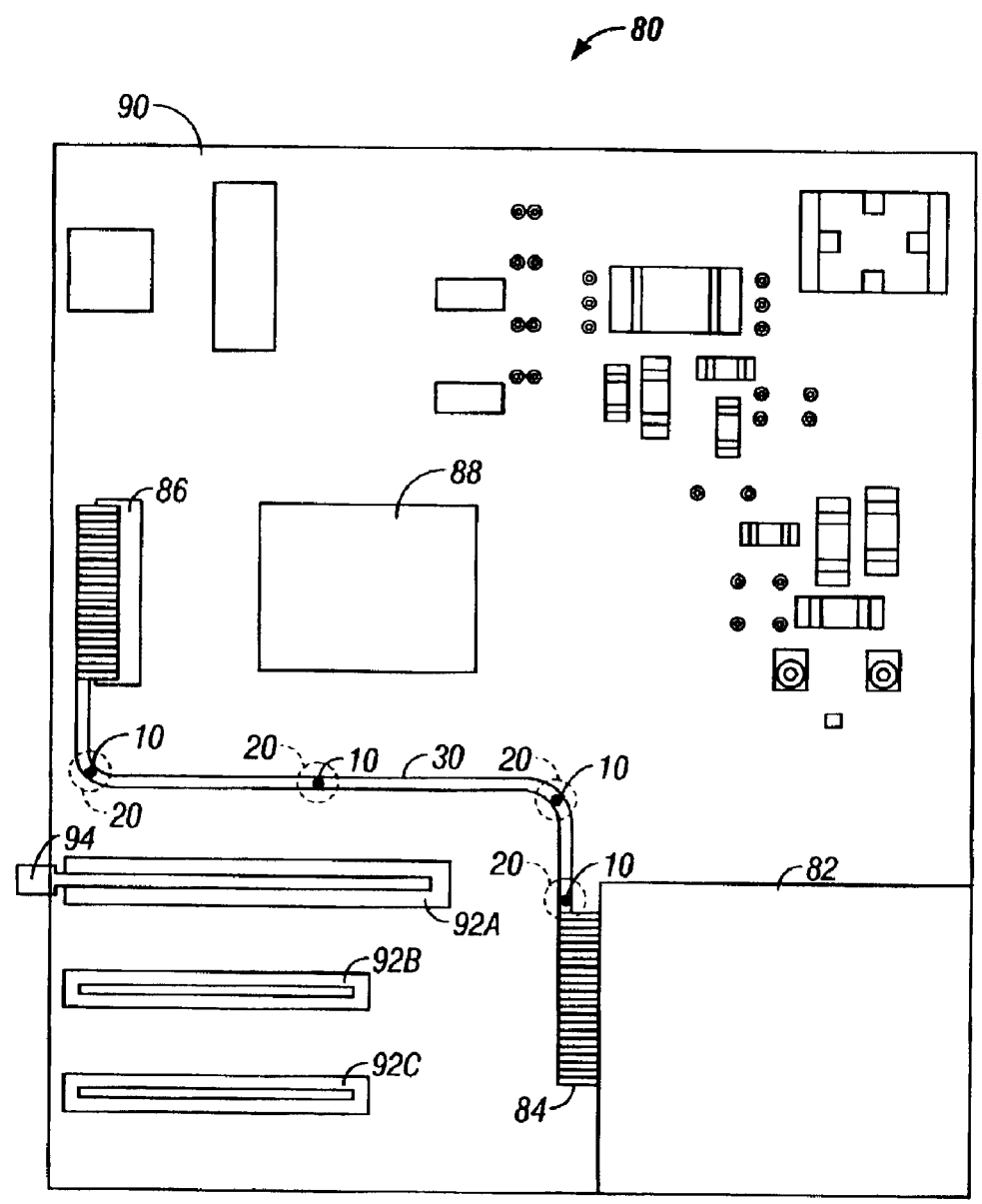
FIG. 6 is an overhead diagram of a processor-based system employing the tie wrap assembly of FIG. 1 according to some embodiments of the invention.

In the overhead shot of FIG. 6, a system 80 is depicted, in which a cable assembly 30 is arranged according to the position of multiple tie wrap bases 20. The system 80 is a computer or other processor-based system, although the tie wrap assembly 50 is useful in many other applications. The system 80 includes a motherboard 90, including a processor 88, multiple expansion slots 92A, 92B, and 92C, and a storage device 82, such as a hard disk drive. An expansion card 94 resides in the expansion slot 92A. In this application, the motherboard 90 is the chassis for the tie wrap assembly 50.

The storage device 82 is coupled to the motherboard 90 by connecting the cable assembly 30 to the cable connector 84 (on the storage device) and to the cable connector 86 (on the motherboard). Four tie wraps 10 retaining the cable assembly 30 are coupled to four tie wrap bases 20 (shown schematically by the dotted circles). By using the tie wrap assembly, the cable assembly 30 can be arranged to be parallel to the expansion slot 92A and away from the processor 88. Further, the cable assembly 30 is placed such that it does not impede the view of other components within the system 80.

The tie wrap assembly 50 provides structure to facilitate cable assembly storage. Positioning of the tie wrap bases 20 along the chassis 40 determines where the cable assembly 30 will be stored. The size of each tie wrap base determines the distance between the cable assembly and the chassis. Thus, the tie wrap assembly 50 creates an outline or template, defining where the cable assembly 30 is to be located within the system 80.

The tie wrap assembly 50 further allows the cable assembly 30 to be temporarily removed, such as during maintenance operations. Following the maintenance, the cable assembly 30 can be returned to a location substantially identical to its prior placement, since the tie wrap bases 20 are permanently affixed to the chassis 40. In some embodiments, the audible sound made by the tie wrap 10 simplifies removal and replacement of the tie wrap 10 into its respective tie wrap base 20, particularly in hard-to-reach locations or locations with spare amounts of light.

The tie wrap assembly 50 also allows removal and reinstallation of the cable assembly 30 without additional cumbersome steps being necessary. With some prior art tie wrap assemblies, the tie wrap is cut before the cable assembly can be removed from the chassis. The tie wrap also may be screwed or otherwise affixed to the chassis, making removal difficult or impossible. The risks of such removal, such as accidently cutting a cable, are avoided with the tie wrap assembly 50.

The tie wrap assembly 50 thus allows the position of the cable assembly 30 to be considered during system design. A computer system, for example, can be manufactured such that the cable assemblies are identically mounted in each system. Particularly where electromagnetic interference (EMI) is a consideration, the ability to pre-arrange component placement is beneficial, in some embodiment, including the pre-arranged placement of the cable assembly.

Further, temporarily removing the cable assembly 30 from the chassis 40 facilitates maintenance, testing, and other invasive system operations. Often, the location of the cable assembly within a system is not pre-arranged, but is based only on the placement of other components. It is not uncommon for bus cables in a computer system to be routed around fans, input/output (I/O) boards, power supplies, and disk drives. When maintenance is performed, the cable assembly is removed, often without consideration of its placement, in order to gain access to other components. Restoring the cable assembly to its original state is unlikely and may even be impossible.

In some embodiments, the tie wrap assembly 50 protects the cable assembly 30 from damage when other components are being installed. Since the cable assembly 30 can readily be removed from the chassis 40, other components can be services without the interference of the cable assembly 30. Because the cable assembly 30 is arranged in a predetermined configuration with respect to the chassis 40, its preferred location is easily ascertainable, and, upon completion of the other component maintenance, can be restored to its original position within the chassis 40.

The tie wrap assembly 50 is scalable. Where very large cable assemblies are to be retained, the size of the tie wrap assembly 50 components can be increased to ensure that the tie wrap 10 can wrap entirely around the cable assembly and the tie wrap base 20 can support the larger tie wrap 10. For very small cable assemblies, smaller components can likewise be used. Further, as illustrated in FIGS. 3 and 4, tie wrap bases 20 of different lengths can be used, as needed, to fit the requirements of a particular application.

A system using the tie wrap assembly 50 saves time in system assembly, according to some embodiments. The tie wrap assembly 50 can be made part of the cable assembly. Once received during the system assembly, the cable assembly may be installed in the system without having the install the tie wraps at the system level.

While the invention has been described with respect to a limited number of embodiments, those skilled in the art will appreciate numerous modifications and variations therefrom. It is intended that the appended claims cover all such modifications and variations as fall within the true spirit and scope of the invention.

We claim:

1. A tie wrap assembly, comprising:
    a tie wrap comprising a first end and a second end, the second end comprising:
        a clasp for receiving the first end upon wrapping the tie wrap around a cable assembly; and
        an engagement member connected to the clasp, wherein the engagement member has a predetermined shape; and
    a tie wrap base for coupling the cable assembly to a chassis, wherein the tie wrap base is not part of the tie wrap, the tie wrap base comprising:
        a head for retaining the tie wrap base in the chassis;
        a non-breakable tapered shaft; and
        a flexible retention orifice for receiving the engagement member, the flexible retention orifice having the predetermined shape; wherein the engagement member fits into the retention orifice such that the cable assembly is mounted on the chassis.

2. The tie wrap assembly of claim 1, wherein the engagement member is pulled out of the retention orifice without breaking the tie wrap or the tie wrap base.

3. The tie wrap assembly of claim 2, further comprising a shank of a predetermined length coupled between the tapered shaft and the head.

4. The tie wrap assembly of claim 3, wherein the length is determined by a desired distance of the cable assembly from the chassis.

5. The tie wrap assembly of claim 1, wherein the tie wrap and the tie wrap base comprise elastomeric material.

6. The tie wrap assembly of claim 1, wherein the tie wrap and the tie wrap base comprise nylon.

7. The tie wrap assembly of claim 1, wherein the tapered shaft comprises a flute disposed along the length of the tapered shaft.

8. The tie wrap assembly of claim 7, wherein the predetermined shape is a globe.

9. A method of tying a cable assembly to a chassis comprising the steps of:
    wrapping a tie wrap around a cable assembly, the tie wrap comprising an end, a clasp for receiving the end, and an engagement member, the engagement member being globe-shaped;
    inserting the engagement member into a globe-shaped retention orifice of a tie wrap base, the tie wrap base having a tapered shaft that flexes transversely outward to receive the engagement member, wherein the tie wrap base is not a component of the tie wrap;
    coupling the tie wrap base to a hole of a chassis; and
    removing the engagement member from the retention orifice without removing the tie wrap from around the cable assembly, wherein neither the tie wrap nor the tie wrap base break when the engagement member is removed from the retention orifice.

* * * * *